B. F. JOSLYN.
WRENCHES.

No. 177,521. Patented May 16, 1876.

Witnesses
Harry Howson Jr
Harry Smith

Benjamin F. Joslyn
by his Attorneys
Howson and Son

UNITED STATES PATENT OFFICE.

BENJAMIN F. JOSLYN, OF WORCESTER, MASSACHUSETTS, ASSIGNOR TO RICHARD P. BRUFF, OF NEW YORK CITY.

IMPROVEMENT IN WRENCHES.

Specification forming part of Letters Patent No. 177,521, dated May 16, 1876; application filed February 26, 1876.

*To all whom it may concern:*

Be it known that I, BENJAMIN F. JOSLYN, of Worcester, Massachusetts, have invented an Improved Carriage-Wrench, of which the following is a specification:

The object of my invention is to so construct a carriage-wrench that the nut to which it has to be applied may, after it has been detached, be retained by and between the jaws of the wrench for ready restoration to its position on the end of the axle. This object I attain in the manner which I will now proceed to describe, reference being had to the accompanying drawing, in which—

Figure 1:
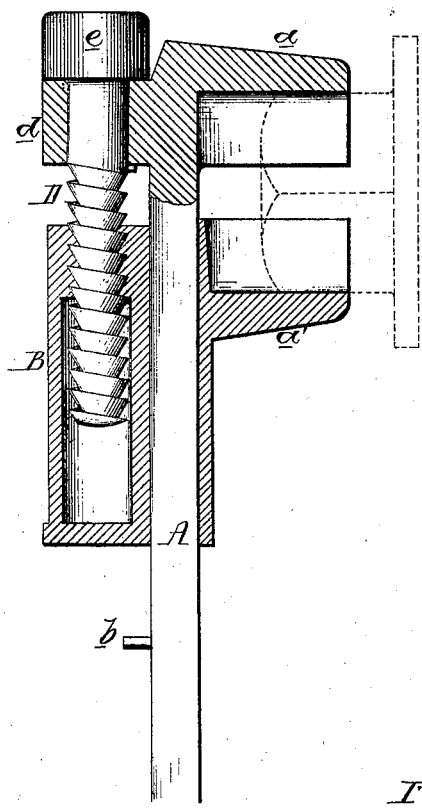
Figure 2:
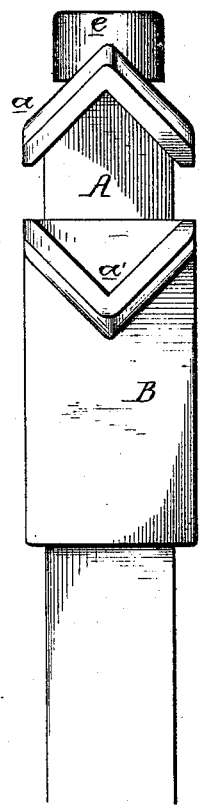
Figure 3:
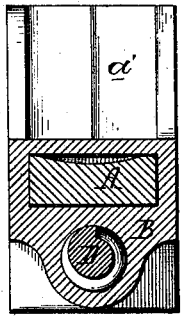

Figure 1 is a sectional view of the wrench; Fig. 2, a front view, and Fig. 3 a transverse section on the line 1 2.

The stem A of the wrench has at its outer end the angular projection $a$, forming the fixed jaw, the movable jaw consisting of a like angular projection, $a'$, on the slide B, which is adapted to the stem A, and which can be moved to and fro on the same to an extent restricted in one direction by the jaw $a$, and in the opposite direction by a pin, $b$, on the stem. The two sides of each jaw are at right angles to each other, (see Fig. 2,) so as to be adapted to the ordinary square nuts of carriage-axles, one of these nuts being shown by dotted lines in Fig. 1. At the outer end and rear of the stem A is a lug, $d$, through which passes the stem of the screw D, the threaded portion of the latter being adapted to the slide B, as shown in Fig. 1, the said slide having a chamber for receiving the screw, the thread of which is thus protected from injury. The head $e$ of the screw is roughened or serrated, so that it can be easily operated by the finger and thumb.

The jaws having been applied to the nut at the end of the carriage-axle, they are made to tightly embrace the same by manipulating the screw D, after which the stem is used as a medium for unscrewing the nut of the carriage-axle, the said nut remaining in the embrace of the jaws after it has been detached, ready for reapplication to the end of the axle after the wheel of the vehicle has been restored to its place thereon.

The frequent loss of nuts after they have been unscrewed from the axles of vehicles, preparatory to the removal of the wheels or lubrication of the journals, is obviated by constructing the wrench in the manner described, so that it will retain a hold of the detached nut.

I claim as my invention—

The stem A, its jaw $a$, lug $d$, and the screw $e$, in combination with the slide B, its jaw $a'$, and its chamber for the reception and protection of the screw, all being constructed as set forth.

In testimony whereof I have signed my name to this specification in the presence of two subscribing witnesses.

BENJAMIN F. JOSLYN.

Witnesses:
HARRY SMITH,
HARRY HOWSON, Jr.